(12) United States Patent
Arora et al.

(10) Patent No.: US 10,810,297 B2
(45) Date of Patent: Oct. 20, 2020

(54) INFORMATION HANDLING SYSTEM MULTI-TOUCH SECURITY SYSTEM

(71) Applicant: Dell Products L.P., Round Rock, TX (US)

(72) Inventors: Mohit Arora, Leander, TX (US); Fernando L. Guerrero, Austin, TX (US); Hariprasad J. Iyer, Round Rock, TX (US); Sathish K. Bikumala, Round Rock, TX (US); Arturo Ramos, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 83 days.

(21) Appl. No.: 15/584,182

(22) Filed: May 2, 2017

(65) Prior Publication Data

US 2018/0322269 A1    Nov. 8, 2018

(51) Int. Cl.
   *G06F 3/0488*    (2013.01)
   *G06F 21/36*    (2013.01)
   *G06F 21/33*    (2013.01)
   *G06F 21/57*    (2013.01)

(52) U.S. Cl.
   CPC .......... *G06F 21/36* (2013.01); *G06F 3/04883* (2013.01); *G06F 21/33* (2013.01); *G06F 21/575* (2013.01)

(58) Field of Classification Search
   CPC .................................. G06F 21/36; G06F 3/041
   See application file for complete search history.

(56) References Cited

U.S. PATENT DOCUMENTS

| | | |
|---|---|---|
| 6,813,491 B1 | 11/2004 | McKinney |
| 7,624,111 B2 | 11/2009 | Reddish et al. |
| 8,174,503 B2 | 5/2012 | Chin |
| 8,539,550 B1 | 9/2013 | Terres et al. |
| 8,646,060 B1 | 2/2014 | Ben Ayed |
| 8,839,375 B2 | 9/2014 | Radzikowski et al. |
| 8,886,217 B2 | 11/2014 | Reitter et al. |
| D732,994 S | 6/2015 | Wentz et al. |
| 9,235,729 B2 | 1/2016 | Robison et al. |
| 9,391,994 B2 | 7/2016 | Matus |
| 2004/0003273 A1 | 1/2004 | Grawrock et al. |

(Continued)

OTHER PUBLICATIONS

Napa Sae-Bae et al., Investigating Multi-touch Gestures as a Novel Biometric Modality, 2012 IEEE Fifth International Conference on Biometric Theory, Applications and Systems (BTAS), pp. 156-161 http://isis.poly.edu/~benapa/index_files/06374571.pdf.

(Continued)

*Primary Examiner* — Olugbenga O Idowu
(74) *Attorney, Agent, or Firm* — Zagorin Cave LLP; Robert W. Holland

(57) ABSTRACT

Pre-boot authentication at an information handling system is selectively bypassed based upon conditions detected at the information handling system that indicate a trusted environment. A security monitor integrated with the pre-boot authentication system detects predetermined conditions that authorize bypassing of the pre-boot authentication, such as location, behavior or password type indications of a trusted environment. In one embodiment, a password is input with touches to match a timing and position passcode, such as by mimicking a musical rhythm.

20 Claims, 6 Drawing Sheets

(56) References Cited

U.S. PATENT DOCUMENTS

| | | | |
|---|---|---|---|
| 2004/0230843 A1* | 11/2004 | Jansen | G06F 21/36 726/7 |
| 2008/0083037 A1 | 4/2008 | Kruse et al. | |
| 2008/0320588 A1 | 12/2008 | Lipetz | |
| 2009/0085760 A1 | 4/2009 | Lee | |
| 2009/0085877 A1* | 4/2009 | Chang | G06F 21/36 345/173 |
| 2010/0328074 A1 | 12/2010 | Johnson et al. | |
| 2011/0154434 A1 | 6/2011 | Hernacki | |
| 2011/0187532 A1 | 8/2011 | Edelstein et al. | |
| 2011/0307941 A1 | 12/2011 | Dhanakshirur et al. | |
| 2012/0046012 A1 | 2/2012 | Forutanpour et al. | |
| 2012/0064948 A1 | 3/2012 | Lee et al. | |
| 2012/0079110 A1 | 3/2012 | Brown et al. | |
| 2012/0182420 A1 | 7/2012 | Grokop et al. | |
| 2012/0235790 A1 | 9/2012 | Zhao et al. | |
| 2012/0254941 A1 | 10/2012 | Levien et al. | |
| 2013/0031595 A1 | 1/2013 | Nevstruev et al. | |
| 2013/0167207 A1 | 6/2013 | Davis et al. | |
| 2013/0260717 A1 | 10/2013 | Miyaki | |
| 2013/0340073 A1 | 12/2013 | Bhaskaran et al. | |
| 2014/0123273 A1 | 5/2014 | Matus | |
| 2014/0201120 A1 | 7/2014 | Lydon et al. | |
| 2014/0208417 A1 | 7/2014 | Robison | |
| 2015/0004956 A1 | 1/2015 | Aksamit | |
| 2015/0067775 A1 | 3/2015 | Cardone et al. | |
| 2015/0106868 A1 | 4/2015 | Lo et al. | |
| 2015/0169858 A1 | 6/2015 | Tg | |
| 2016/0253502 A1 | 9/2016 | Martins | |
| 2016/0313821 A1 | 10/2016 | Bui et al. | |
| 2017/0091438 A1* | 3/2017 | Raziel | G06F 21/575 |

OTHER PUBLICATIONS

Everykey.com, No More Passwords, No More Keys, printed Apr. 18, 2017, https://everykey.com.

Apple.com, Automatically unlock your Mac with your Apple Watch, printed Apr. 18, 2017, https://support.apple.com/en-us/HT206995.

Techcrunch.com, Natasha Lomas, Everykey Wants to Put Your Passwords on Your Wrist, Nov. 8, 2014, https://techcrunch.com/2014/11/08/everykey/.

Droid-life.com, Google Adds "On-Body Detection" to Smart Lock in Android 5.1, printed Apr. 17, 2017.

* cited by examiner

INFORMATION HANDLING SYSTEM MULTI-TOUCH SECURITY SYSTEM

CROSS REFERENCE TO RELATED APPLICATION

U.S. patent application Ser. No. 15/584,192, entitled "Information Handling System Multi-Security System Management" by inventors Mohit Arora, Fernando L. Guerrero, Vani Budhati, Danilo O. Tan, Hariprasad J. Iyer, and Sathish K. Bikumala, filed on even date herewith, describes exemplary methods and systems and is incorporated by reference in its entirety.

BACKGROUND OF THE INVENTION

Field of the Invention

The present invention relates in general to the field of information handling system security, and more particularly to information handling system multi-touch security system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often store and have access to sensitive information of individuals and enterprises, such as financial information and personal identification information. To protect sensitive information, information handling systems often include security measures with password protection. For example, an operating system typically includes a password that an end user must enter before using an information handling system. Once the operating system receives the password, the end user typically has full access to operating system functions and information accessible by the operating system for a limited time period. For instance, a screen saver with password protection will assert after 5 to 15 minutes of inactivity at the information handling system. After assertion of the screen saver, the end user typically must input the password again to access the operating system.

Although password protection at an operating system level reduces the risk of unauthorized access to an information handling system, it does not guarantee protection of underlying information stored on the information handling system, such as on persistent storage devices like the hard disk drive or solid state drive. In some instances, the basic input/output system (BIOS) manages password protection to access the persistent storage device. In addition, particular information within persistent storage often has separate password protection, such as through a particular application that runs over the operating system. To the extent that the password accesses are managed over the operating system, the operating system itself remains a weak link available for attack by hackers. In some instances, the many different layers of security create end user confusion and disinterest in using password protection. For example, an end user who feels adequately protected by an operating system password may elect not to use other types of access protection or security measures. As another example, end users may elect simple passwords to help remember multiple different passwords where the simple passwords are typically easier to hack.

One additional security measure that helps to secure information in persistent storage is pre-boot security. Pre-boot security uses a password to protect persistent storage devices by encrypting the stored information. In order to boot an information handling system that has pre-boot security, the BIOS typically receives a password and then applies the password to decrypt the operating system on the persistent storage and allow boot. After the operating system boots, the operating system password protection is typically presented so the end user can access the operating system and information controlled by the operating system. Generally, in a pre-boot scenario, security concerns limit the communication of security credentials between the pre-boot operating system and the primary operating system so that a compromised primary operating system will not provide an avenue for hacking of the pre-boot security measures. As a result, pre-boot applications that execute on the pre-boot operating system are typically limited to support of MSA or web-based authentication and unable to support local primary operating system accounts.

The use of multiple security systems at an information handling system tends to create complexity, especially in a desktop environment where the information handling system relies upon external peripherals, such as a horizontal display that acts as an input device. For example, a horizontal display rests on a desktop to provide visual images and a touchscreen that accepts end user inputs. In some environments, the horizontal display integrates processing components that operate as a separate information handling system with its own operating system and, in some cases, its own pre-boot security. Pre-boot security often relies upon hardware integrated with the information handling system that operates independent of the operating system, such as a finger print scanner. As an end user interacts with a multi-system multi-peripheral environment, information handling system operating system security timeouts may intermittently lock out display presentations resulting in the end user attempting to sign into different devices at different intervals with different passwords. Further complication is involved where the information handling systems and related devices include their own multiple levels of security and network interfaces.

SUMMARY OF THE INVENTION

Therefore, a need has arisen for a system and method which manages information handling system end user authentication in a multi-security system.

A further need exists to accept touch passcode inputs at an information handling system in a secure manner that is also memorable to an end user.

In accordance with the present invention, a system and method are provided which substantially reduce the disadvantages and problems associated with previous methods and systems for managing information handling system security. One of plural authentication systems is selectively bypassed based upon the security environment sensed by an information handling system. Security passcodes input to the information handling with touches have time and position relationships that provide increased security with a more memorable passcode.

More specifically, an information handling system processes information with a processor and memory by executing an operating system and applications retrieved from persistent memory, such as a solid state drive. On power up, the information handling system has a pre-boot authentication system and passcode that protects information stored on the persistent memory. After input of pre-boot authentication information, the information handling system boots the operating system to enter a passcode to an operating system authentication system for access to operating system functionality. In one example embodiment, touch passcodes input at a touchscreen display include temporal and positional information relative to a user-initiated input vector so that the touch passcode provides a memorable pattern, such as a musical rhythm. A security monitor executing on the information handling system tracks external information to classify the operating environment as trusted or not trusted. In a trusted environment, passcode entry may be bypassed to allow end user access, such as by providing automated pre-boot authentication when the detected environmental conditions indicate a low threat. For example, pre-boot authentication is bypassed if networks associated with a safe location are detected, if end user behavior indicates interactions by a trusted end user, if other devices operating in proximity indicate a successful authentication, or other factors that may be available.

The present invention provides a number of important technical advantages. One example of an important technical advantage is that an information handling system simplifies authentication to encourage end user adoption of authentication systems. One simplification is the use of memorable touch passcodes that are difficult to mimic by observation. Location and timing information for touches across an entire hand allows an end user to create a passcode with a memorable rhythm where the hand remains in proximity to the touchscreen display during the input so that unauthorized copying is more difficult to accomplish. Another simplification is that pre-boot authentication is bypassed in trusted scenarios allowing an end user to access the information handling system with an operating system passcode. Bypassing pre-boot authentication provides more rapid access to information and reduces inconvenience placed on the end user while maintaining strong security in untrusted environments. End users feel more inclined to adopt stringent security measures, such as pre-boot authentication, where the more stringent security measures are enforced in untrusted situations and bypassed in trusted situations.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Information handling security is managed across multiple authentication systems based upon a security environment associated with the information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
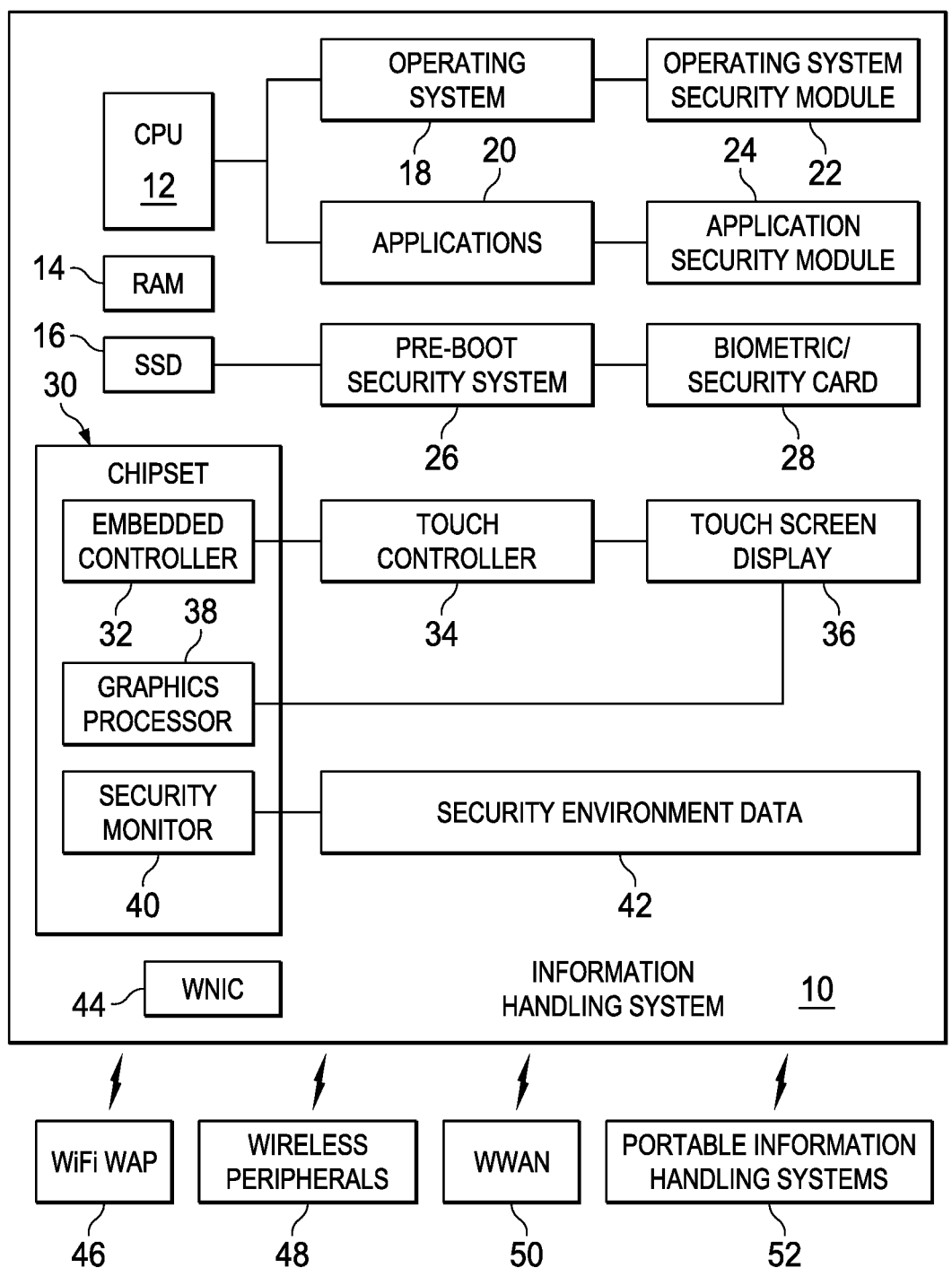
FIG. 1 depicts a block diagram of an information handling system having managed multi-security system authentication.

Referring now to FIG. 1, a block diagram depicts an information handling system 10 having managed multi-security system authentication. Information handling system 10 processes information with a central processing unit (CPU) 12 that executes instructions and random access memory (RAM) 14 that stores the instructions and information. In a typical configuration, a persistent storage device, such as a solid state drive (SSD) 16 or hard disk drive (HDD), stores an operating system 18 and applications 20 during power off that are booted to an on state at power on. Operating system 22 includes an operating system security module 22 that provides password protection for access to functions of operating system 18 and application security modules 24 provide password protection for information associated with particular applications 20. On start, operating system 18 is booted from persistent storage in SSD 16 by embedded code that executes on chipset 30 to initiate a basic input/output system (BIOS) on CPU 12. In order to access operating system 18, chipset 30 executes a pre-boot operating system that includes a pre-boot security system 26 that protects information stored on SSD 16, such as by encryption. Pre-boot security system 26 has authentication that allows decryption of information on SSD 16, such as a password or other authentication. In the example embodiment, pre-boot security system 26 releases an encryption passcode in response to biometric or security card reader 28 receiving authentication information, such as a fingerprint or RF code. Thus, in summary, information handling system 10 has dual security measures that protect separate levels of access. At a first level, encrypted information on SSD 16 is decrypted in response to a first authentication and includes an operating system 18. At a second level, once operating system 18 is decrypted and loaded into RAM 14, a second authentication provides access to operating system 18 functions.

Once operating system 18 is actively managing information handling system 10 on CPU 12, operating system 18 interacts with processors and controllers of chipset 30 to manage end user inputs and outputs. In the example embodiment, an embedded controller 32 executes embedded code stored in flash memory to manage input devices, such as inputs by an end user through a keyboard and mouse. The example embodiment depicts inputs managed through a touch controller 34 and touchscreen display 36. Images on touchscreen display 36 present input devices, such as a keyboard, with pixel values provided from a graphics processor 38. Graphics processor 38 processes visual information provided by CPU 12 to create pixels values that define visual images on touchscreen display 36. Operating system 18 cooperates with processing components and embedded code of chipset 30 to present input devices and accepts inputs touchscreen display 36. Other inputs and communications are supported through a wireless network interface card (WNIC) 44, such communications with wireless local area networks (WLANs) through a wireless access point (WAP) 46 and wireless wide area networks (WWAN) through a WWAN tower or access 50. Wireless peripherals 48 and portable information handling systems 52 may interface with WNIC 44 through other networks or directly with a peer-to-peer network or wireless personal area network (WPAN). Operating system 18 manages security at information handling system 10 by monitoring system use and applying security settings based on detected use. In one embodiment, screen timeout security is enabled after a predetermined time, such as 5 to 15 minutes, so that an end user must re-enter the operating system authentication information if the end user does not interact with the information handling system within the screen timeout.

One difficulty with the use of multiple security systems is that an end user has to interact with both security systems at each authentication in order to fully benefit from the offered security. If, for example, operating system 18 times out to require authentication, then pre-boot security system 26 also should lock SSD 16 to fully protect information handling system 10; however, locking SSD 16 causes the end user to have to input both pre-boot and operating system authentications at each time out. Any communication of pre-boot authentication information to operating system 18 puts pre-boot authentication security at risk in the event of a breach of operating system 18 security. A security monitor 40 manages multi-security systems so that system security and end user convenience have a balanced approach based upon the security environment detected at information handling system 10. As a simple example, security monitor 40 selectively locks pre-boot security system 26 at different predetermined conditions than operating system security module 22, such as 5 minutes of non-activity for operating system 18 and 15 minutes for pre-boot security system 26. In more complex scenarios, screen lock times for each security system varies based upon security parameters monitored by security monitor 40 as set out in greater detail below. Further, additional security systems may be managed by security monitor 40, such as application security modules 24. In various embodiments, security monitor 40 may be code stored in non-transitory memory of chipset 30, operating system 18, or other specialized processing components, such as a trusted platform system.

Generally, security monitor 40 monitors operating conditions detectable by information handling system 10 and applies the operating conditions to determine whether to enforce authentication at pre-boot security system 26. The operating conditions may be monitored at initial startup of information handling system 10 with code executing on a pre-boot operating system, or may be monitored after pre-boot authentication by sending a message that locks pre-boot security system at predetermined parameters so that a pre-boot authentication is required to access information stored on SSD 16. One example of monitoring by security monitor 40 is the monitoring of wireless information that indicates the location of information handling system 10. For example, pre-boot security system 26 keeps a hash of detected SSIDs, mac addresses, security configurations (WPA, WPA2, WEB, no key) IP addresses, subnets, subnet masks, and DNS for known safe locations. If security monitor 40 generates the hash based upon detected wireless signals, pre-boot authentication is provided for SSD access without end user inputs. As another example, is proximity-based detection of wireless devices. For example, portable devices detected proximate information handling system 10 at time out are compared with devices detected at renewed use as a way of estimating whether the information handling system has moved since the security timeout was commanded. If proximate devices are different, then pre-boot security system 26 is locked at renewed use so that the end user must input both authentications to access information handling system 10. Other indications of movement may include acceleration readings during the timeout of the operating screen, GPS readings if available, camera images captured, etc. In one embodiment, security monitor 40 monitors the use of other information handling systems 52 to help discern the activity of the end user, such as if a telephone call is taken on a portable information handling system. Generally, indications of end user behavior may be monitored by security monitor 40 to determine a security condition for manual versus automated authentication at a pre-boot authentication system. For example, certain patterns of wireless networks including received signal strength at known locations, sounds, voices, accelerations, ambient light detection of the brightness of the location, peripheral device identifiers, etc. may occur when an end user travels to a work environment where pre-boot authentication may be considered unnecessary. In one example embodiment, security monitor 40 is a low-power controller awakened by accelerations that is able to monitor security conditions even when information handling system 10 is powered off. In another example, noise patterns tracked through a microphone may indication a location, such as a ceiling fan or the 5 o'clock train. Other sensors may be referenced as available by tracking and storing sensed information for a known location and comparing the sensed information when confirming a system's locations, such as moisture readings, electrostatic measurements, camera images that show position characteristics at a known location like height above a floor, unrelated wireless signals like baby monitors, security systems, television tower signal strength, wireless landline telephones or other indicia. By characterizing a known location's patterns a direct comparison becomes possible on subsequent accesses that increases the probability that a system is in the known secure location indicated by the passcode inputs. Artificial intelligence or other learning algorithms may be applied to rank security characteristics for particular situations and balance security and convenience factors for the end user.

Figure 2:
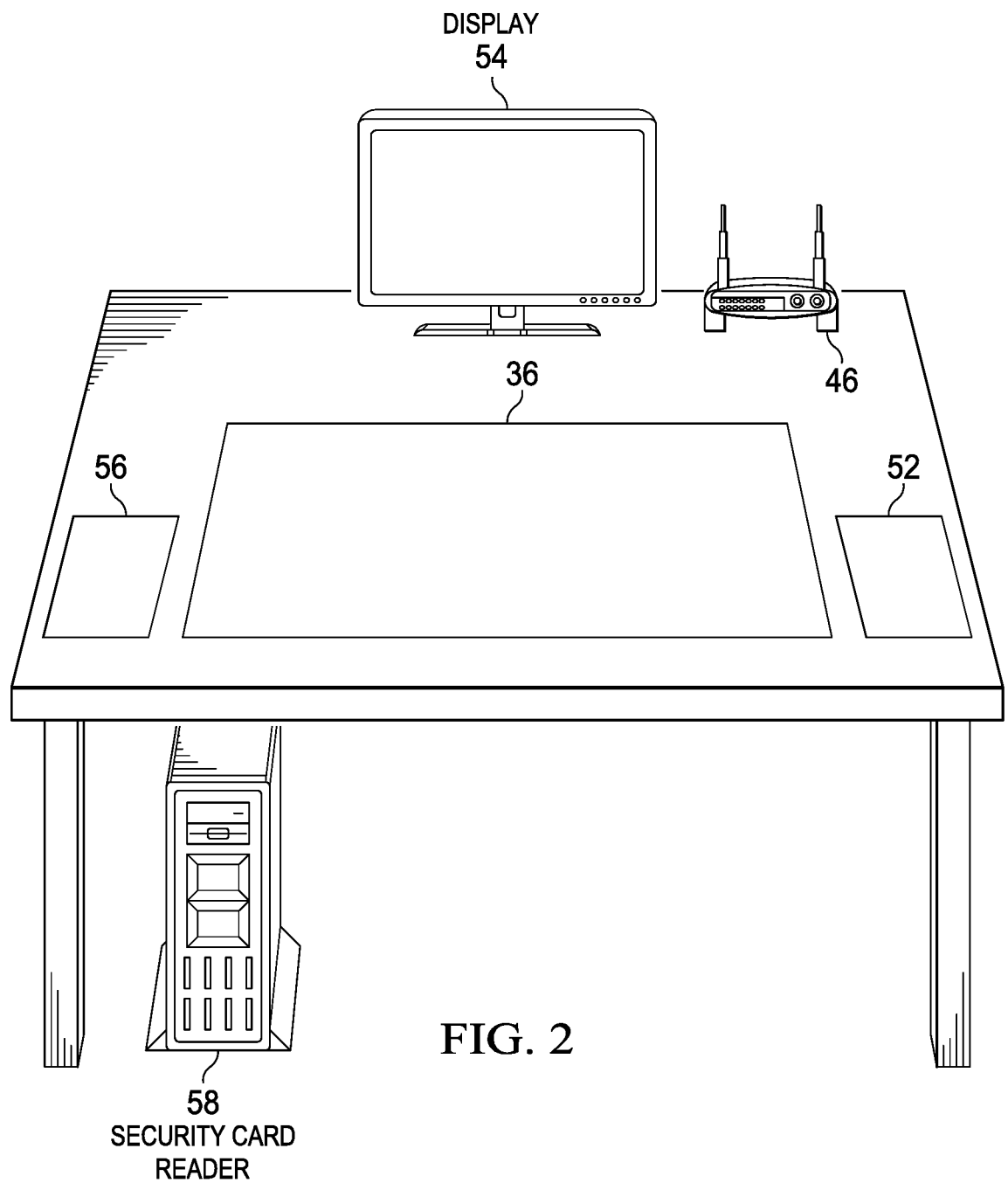
FIG. 2 depicts the information handling system deployed in a desktop environment with a horizontal touchscreen display.

Referring now to FIG. 2, the information handling system 10 is depicted deployed in a desktop environment with a horizontal touchscreen display 36. Display 36 provides a desktop environment with interactive user interfaces accessed through end user touches. As depicted by FIG. 2, information handling system 10 includes a fingerprint reader 56 and security card reader 58 that provide pre-boot authentication of information handling system 10. An end user coming to an office environment where information handling system 10 remained overnight places down his smartphone information handling system 52 and applies power to startup information handling system 10. A security monitor 40 of information handling system 10 detects the secure environment so that pre-boot authentication is not required. If, in contrast, portable information handling system 52 were not detected, security monitor 40 might instead require just one pre-boot authentication for the day. In an alternative embodiment where information handling system 10 is a portable system, such as a laptop, the number or types of pre-boot authentications may vary based upon accelerations detected at the portable system. Security settings may define how sensitive security authentication requirements are relative to the detected environment.

Figure 3:
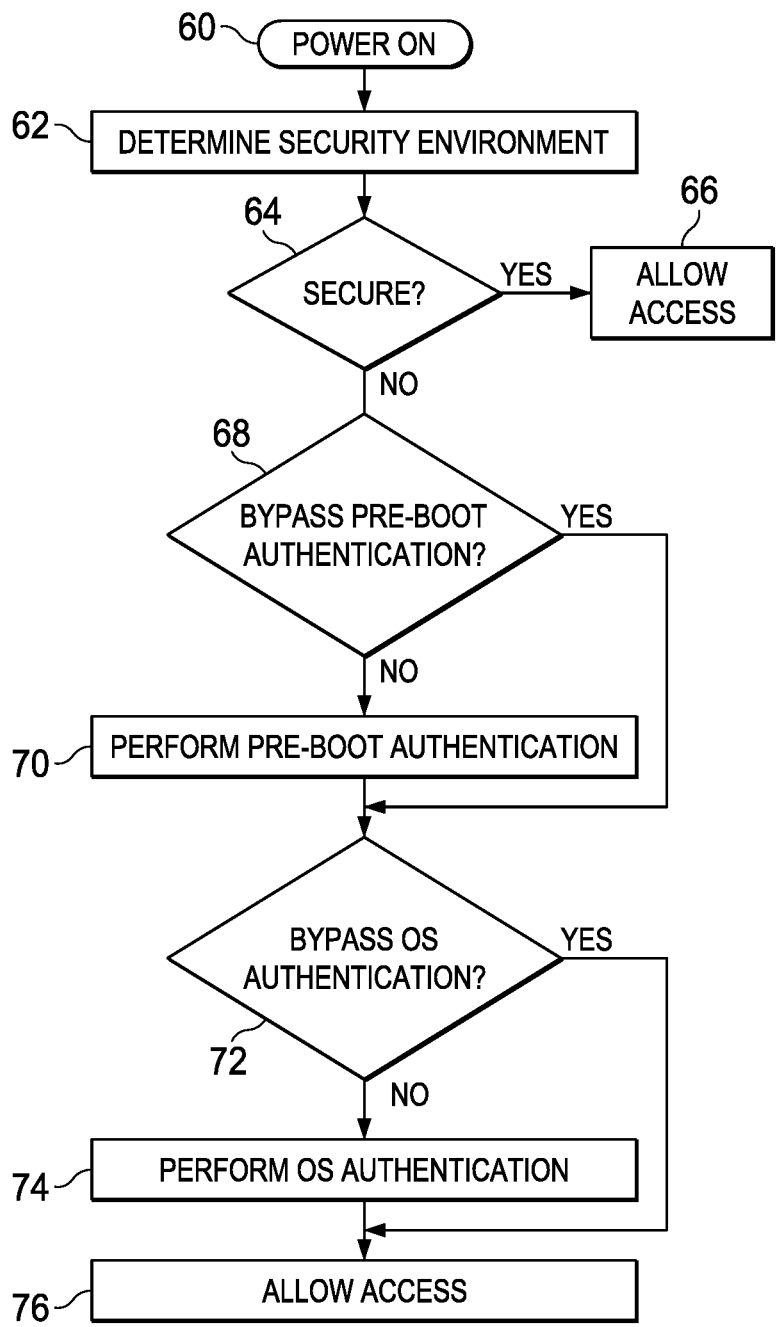
FIG. 3 depicts a flow diagram of a process for management of multi-security system authentication.

Referring now to FIG. 3, a flow diagram depicts a process for management of multi-security system authentication. The process starts with power up of the information handling system at step 60. At step 62, a determination is made of the security environment of the information handling system. For example, a scan is performed for wireless networks and wireless devices in proximity of the information handling system and compared with wireless networks and wireless devices associated with secure locations. As another example, an accelerometer wakes at accelerations and logs the accelerations and times in flash memory so that on power up of the information handling system the security monitor reads the log to determine if the information handling system remains in the same location or has been moved since its last operational on state. If at step 64 a high degree of security is detected, the process continues to step 66 to allow access to the information handling system. In such a scenario, pre-boot authorization is provided by the pre-boot operating system or remains open and is not closed so that operating system boot may take place.

If the determination at step 64 is that the environment is not secure, the process continues to step 68 to determine if pre-boot authentication should be bypassed. In such a scenario, some degree of security is provided by other passcode protection but the security level is not considered safe enough to skip all security steps. The determination to bypass pre-boot authentication may be performed by the security monitor running over the pre-boot operating system. If pre-boot authentication is not bypassed, the process continues to step 70 to perform pre-boot authentication, otherwise the process continues to step 72 at which a determination is made of whether to bypass operating system authentication. As an example, if a pre-boot authentication is performed with a high enough degree of security, the operating system allows access without input of the operating system authentication. If instead pre-boot authentication was bypassed or the security environment is deemed questionable, operating system authentication is performed at step 74. At step 76, access to the information handling system is allowed. During screen timeouts, a similar process is applied to determine the authentication required to access the information handling system.

Figure 4:
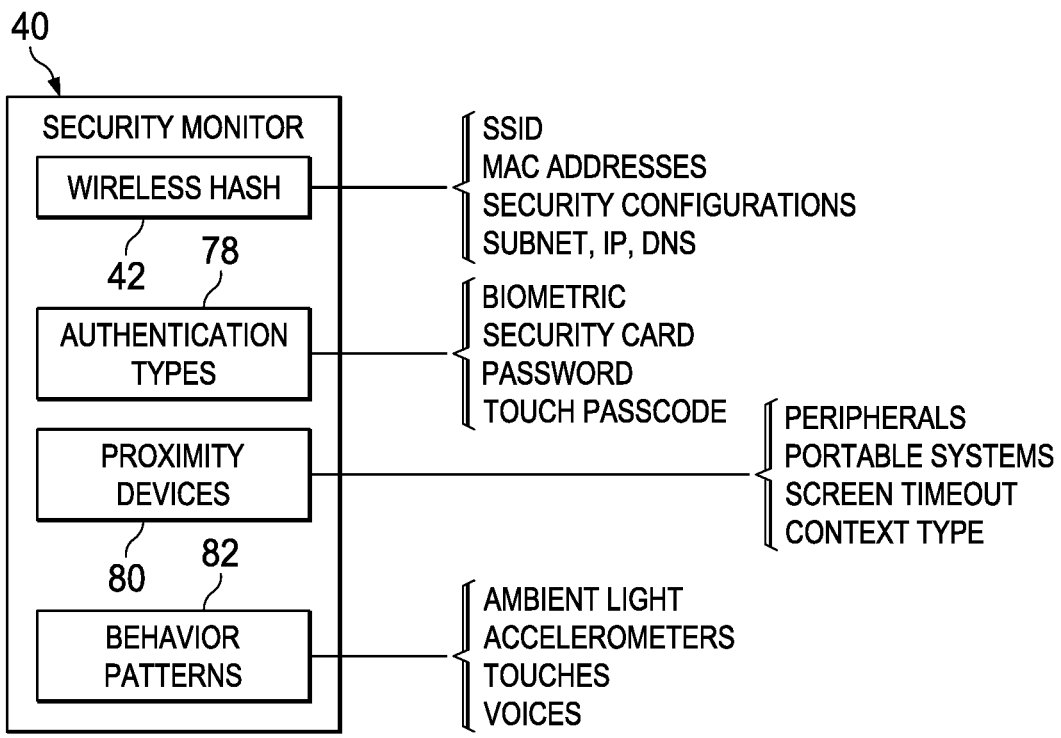
FIG. 4 depicts a block diagram of a security monitor that manages multi-security system authentication.

Referring now to FIG. 4, a block diagram depicts a security monitor that manages multi-security system authentication. A wireless hash 42 stores network locations for known secure locations. Wireless hash 42 is built over time by monitoring end user actions that indicate a secure environment or may be defined by storing defined safe networks. Authentication types 78 include the various types of authentication that will provide access to the information handling system, such as biometric, security card, password and touch passcodes that allow access. The security at the information handling system may vary based upon the type of authentication information used by the end user. For example, a stolen security card presents a greater risk than unauthorized duplication of a touch passcode so that higher authentication standards may be enforced where weaker authentication was provided to obtain information handling system activation. Proximity of devices 80 provides indicates security by indicating location and end users proximate to the information handling system. Behavior patterns 82 tracked over time indicate that an end user interfaced with the information handling system who is following historical behavior patterns is more trustable as the authentic end user. Security monitor 40 weighs the various data points against sensed data to enforce a security authentication appropriate for the situation.

Figure 5B:
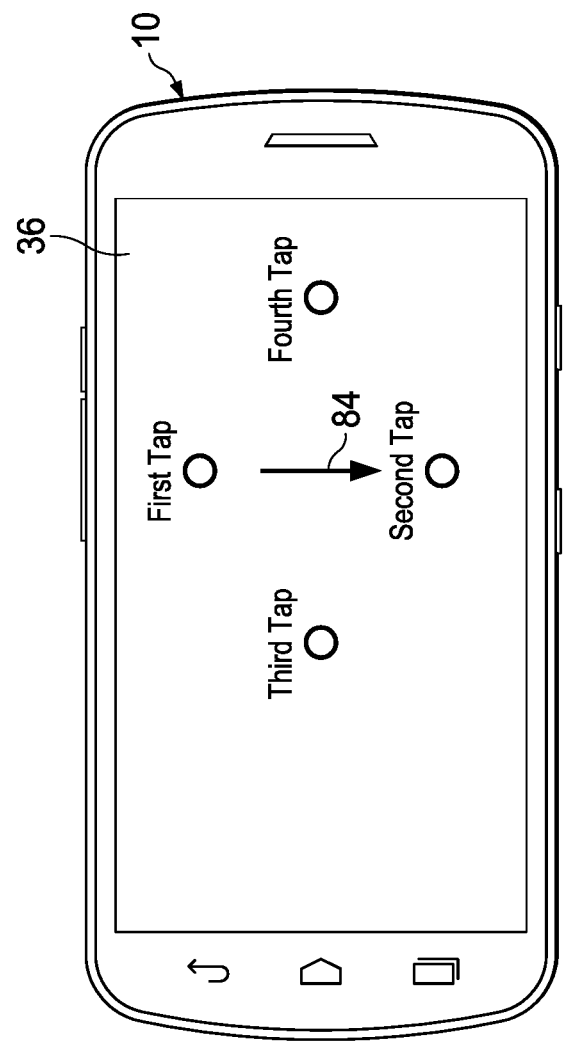
FIGS. 5A and 5B, generally referred to as FIG. 5, depict vector based touch authentication.
Figure 5A:
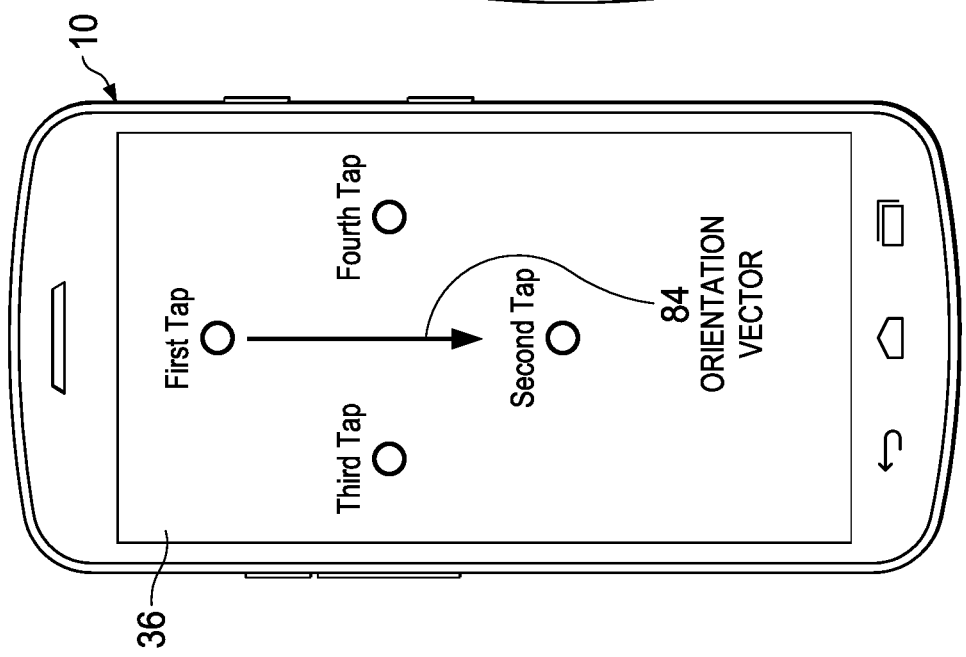

Referring now to FIG. 5, vector based touch authentication is depicted. Vector based touch authentication establishes a touch passcode with touch inputs defined relative to an initial touch input. In the example embodiment, a sequence of four touch inputs provide a passcode to open access to a portable information handling system 10. FIG. 5A depicts the touch inputs made in a portrait landscape with the first two inputs defining the orientation vector 84. The third input is made to the left of orientation vector 84 and the fourth input is made to the right of orientation vector 84. FIG. 5B depicts the touch inputs made in a landscape orientation with orientation vector 84 defined at a right angle relative to FIG. 5A. In the example embodiment, the first two touches establish the orientation vector that defines the passcode's subsequent input positions. In alternative embodiments, the first two touches may also define the relative spacing between the passcode's subsequent touches by defining passcode touches in proportion to each other.

Figure 6:
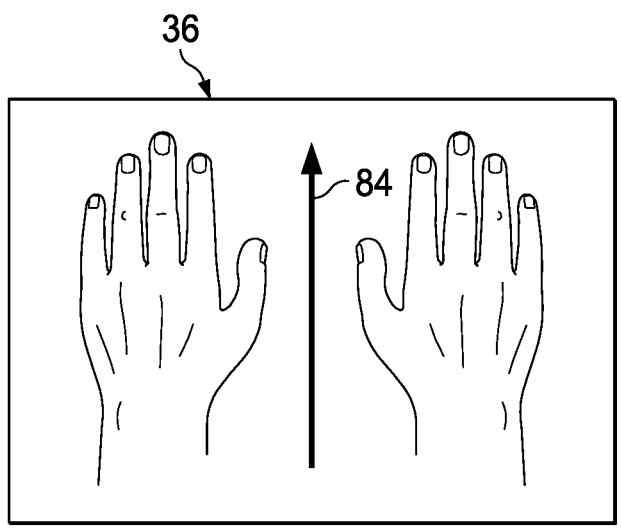
FIG. 6 depicts hands positioned to initiate authentication with vector based touch authentication.

Referring now to FIG. 6, hands are depicted positioned to initiate authentication with vector based touch authentication. In the example embodiment, placing both palms flat on touchscreen display 36 establishes orientation vector 84 and a proportional spacing of the touch inputs that adapt to the end user's hand size. In one example embodiment, an orientation vector 84 is established for each hand. In addition, establishing the initial touch vector from a flat hand placement provides a ready input of a memorable yet difficult to mimic hand touch passcodes for pre-boot or operating system authentication. Specifically, touching with hand portions at different pressures creates a unique touch pattern that is tied to individual hand size and difficult to visually discern. Adding a temporal element to the spatially defined touches of a passcode with a palm faced downward to the touchscreen creates a musical and/or rhythmic element memorable to the end user. Taps at the touchscreen with timed periods between inputs allows the end user to hum or sing a tune while tapping specific portions of the hand down.

Figure 7:
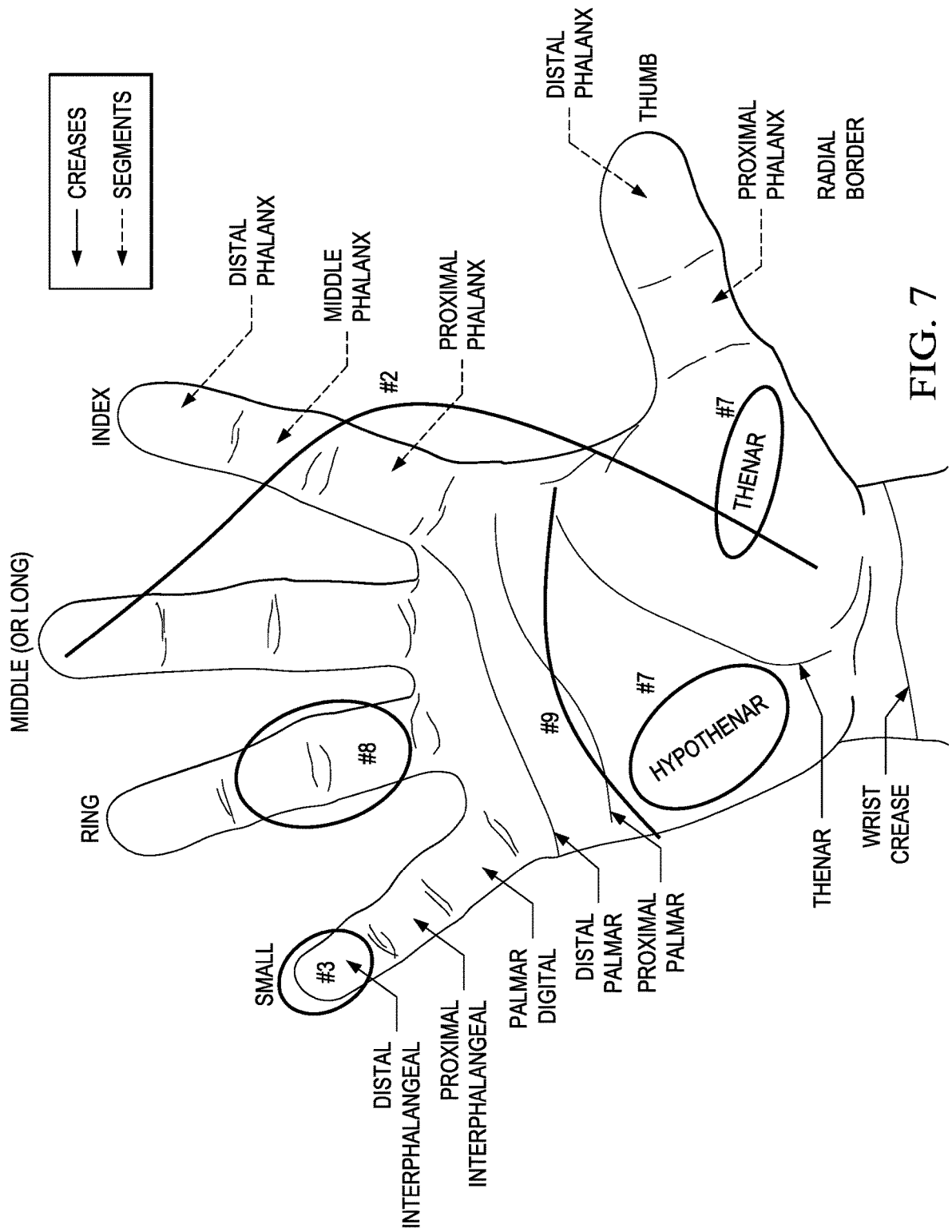
FIG. 7 depicts examples of different portions of an end user hand that inputs authentication touches.

Referring now to FIG. 7, examples are depicted of different portions of an end user hand that inputs authentication touches. By laying a palm flat on a touchscreen display, the end user starts with a quantity to touch points in the shape of that end user's palm that are difficult to duplicate. Opposing base regions of the palm, such as the hypothenar and thenar may be lifted slightly in combination with all different fingertips or finger portions so that very unique touch inputs are generated without visual duplication being easily accomplished. The end user creates the touch pattern with timed touches, such as by touch with a musical beat. The temporal touches might involve slight hand shifts from one side of the palm to the other in a beat that matches a favorite song of the end user, such as Chopin's Minute Waltz. Since a high complexity of touches is introduced in a memorable way, the touch input passcode may be granted a higher security value for establishing an authentic end user, thus making multiple passcode input less necessary, such as by allowing a sufficiently complex musical timed touch passcode authenticate both pre-boot and operating system security access. In one embodiment, if the touch passcode is entered with errors, it may allow a limited access that requires additional authentication to access the information handling system. To change the touch passcode to become more easily reproduced, the end user enters a setup code, places both hands on the touchscreen display, creates a passcode with a series of timed touches and repeats the touch passcode for verification. In alternative embodiments, a single hand touch passcode may be used instead of a two-handed touch passcode.

Although the present invention has been described in detail, it should be understood that various changes, substitutions and alterations can be made hereto without departing from the spirit and scope of the invention as defined by the appended claims.

What is claimed is:

1. An information handling system comprising:
    a central processing unit operable to execute instructions to process information;
    a memory interfaced with the central processing unit and operable to store the instructions and information;
    a chipset having processors and non-transitory memory, the processors executing embedded code stored in the non-transitory memory;
    a graphics processor operable to process information into visual information for presentation at a display;
    a touchscreen display interfaced with the graphics processor, the touchscreen display operable to present the visual information as visual images; and
    a security monitor stored in the non-transitory memory and interfaced with the touchscreen display to accept touches as a vector passcode that authorizes access to the information, the security monitor measuring the vector passcode from first and second touches defining an orientation vector having a spacing, the security monitor comparing remaining touches of the passcode relative to the orientation vector defined between the first and second touches independent of the touchscreen display orientation and by comparing spacing of the remaining touches of the passcode proportional to the spacing between the first and second touches.

2. The information handling system of claim 1 further comprising:
    a first security system comprising pre-boot authentication; and
    a second security system comprising operating system authentication;
    wherein input of a vector passcode satisfies both the first and second security systems.

3. The information handling system of claim 1 wherein the first and second touches require a temporal relationship to establish the vector.

4. The information handling system of claim 1 wherein all of the vector code touches require a temporal relationship in order to meet the touch code input.

5. The system of claim 1 wherein at least one of the first and second touches corresponds to an area of the hand having a size greater than a fingertip.

6. The system of claim 5 wherein the area of the hand is the palm.

7. The system of claim 5 wherein the area of the hand is the hypothenar but not the thenar.

8. The system of claim 5 wherein the area of the hand is the thenar but not the hypothenar.

9. The system of claim 1 wherein:
    the vector passcode touches comprise touches from first and second hands of an end user; and
    the vector passcode touches have a temporal relationship that imitates a musical rhythm.

10. A method for securing an information handling system, the method comprising:
    securing access to information stored on the information handling system with a touch passcode having plural touches;
    initiating input of the touch passcode with a first and second of the plural touches having a predetermined relationship with each other including at least an orientation vector and spacing; and
    measuring subsequent touches of the touch passcode made after the first and second touches against the touch passcode relative to the orientation vector defined between the first and second of the plural touches initiating input of the touch passcode independent of an orientation of the information handling system; and
    measuring spacing of the subsequent touches of the touch passcode in proportion to the spacing of the first and second of the plural touches.

11. The method of claim 10 further comprising:
    inputting the touch passcode with a temporal relationship between the touches; and
    measuring the time between the touches to validate the passcode if the measured time is within a predetermined amount of a passcode time.

12. The method of claim 11 further comprising enabling limited access to the information if the measured time does not fall within the predetermined time and does not exceed a time limit.

13. The method of claim 10 wherein initiating input of the touch passcode further comprises laying both of an end user's hands palms down on a touchscreen display.

14. The method of claim 13 wherein the vector comprises a relative orientation of the touches to the touchscreen that aligns with the end user's hands.

15. The method of claim 10 wherein the passcode touches imitate a musical rhythm.

16. The method of claim 10 wherein:
    a first set of touches spatially and temporally defined relative to an initial touch vector that authenticates an end user for pre-boot authentication; and a second set of touches spatially and temporally defined relative to an initial touch vector that authenticates and end user for operating system authentication.

17. The method of claim 16 wherein the first set of touches is bypassed if predetermined conditions are detected at the information handling system.

18. The method of claim 10 further comprising:
inputting a setup code;
within a predetermined time of the setup code, laying both end user hands on a touchscreen display palm down;
creating a touch passcode with a series of temporally and spatially placed touches; and
saving the touch passcode on the information handling system.

19. A system for securing an information handling system, the system comprising:
a processor;
non-transitory memory storing instructions that when executed on a processor:
restricts access to information stored on the information handling system subject to input by an end user of a passcode;
receives passcode touch inputs from a touchscreen display;
compares the position and timing of the passcode touch inputs to authorized passcode touch inputs, the passcode touch inputs including a first touch input and a second touch input having an orientation vector and spacing, the position of the touch inputs compared by comparing touch inputs of the passcode made after the first touch input and the second touch input with the orientation vector defined between the first touch input and the second touch input independent of the orientation of the information handling system and by comparing spacing of the touch inputs of the passcode made after the first touch input and the second touch input in proportion with the spacing defined between the first touch input and the second touch input;
authorizes access to the information if the passcode touch input position and timing fall within a predetermined limit of the authorized passcode touch inputs; and
denies access to the information if the passcode touch input position and timing fall outside a predetermined limit of the authorized passcode touch inputs.

20. The system of claim 19 wherein the authorized passcode touch inputs mimic a musical rhythm.

* * * * *